United States Patent Office 3,733,306
Patented May 15, 1973

3,733,306
PREPARATION OF POLYARYL ESTERS
Wolfgang Wolfes, Mondorf, and Erich Behr, Troisdorf, Germany, assignors to Dynamit Nobel AG, Troisdorf, Postfach, Germany
No Drawing. Filed July 14, 1971, Ser. No. 162,714
Claims priority, application Germany, July 18, 1970, P 20 35 846.7
Int. Cl. G08g 17/003
U.S. Cl. 260—61                    7 Claims

ABSTRACT OF THE DISCLOSURE

In the preparation of a polyaryl ester by condensing at least one aromatic dicarboxylic acid chloride with at least one dihydric phenol in the presence of metallic magnesium as catalyst to produce HCl and a polyaryl ester, the improvement which comprises dissolving said acid chloride and phenol in an inert organic solvent and contacting said solution with the metallic magnesium in subdivided form at a temperature between about 170 and 280° C. Advantageously the preheated solution is trickled through a bed of magnesium chips in a heated pipe with a contact time of less than about 10 minutes. The conversion in the pipe exceeds 80%, based on HCl formed, and the product may be further condensed in known manner to viscosities in excess of 1.

---

The present invention relates to a novel process for preparing polyaryl esters by condensing aromatic dicarboxylic acid chlorides with dihydric phenols.

The following condensation processes have been described for preparation of polyaryl esters:

(1) Transesterification of the diacetate of dihydric phenols with dicarboxylic acids or of phenyl diesters of dicarboxylic acids with dihydric phenols;

(2) Interfacial condensation of dicarboxylic acid chlorides and phenolates of dihydric phenols;

(3) Solution condensation of dicarboxylic acid chlorides and tertiary amine salts of dihydric phenols at room temperature; and (4) Solution condensation of dicarboxylic acid chlorides and dihydric phenols in inert, high-boiling solvents at temperatures above 150° C. with simultaneous driving off of the by-product hydrogen chloride.

The latter method was investigated in detail especially by Korshak and Vinogradova who furnish data on this condensation method and literature references in their book "Polyesters," Pergamon-Press, Ltd., London, 1965, pages 448 to 518. The reaction rate is mainly dependent upon the reaction temperature. Below 150° C. the reaction proceeds too slowly without catalysts; above 210° C. the formed esters discolor easily. The optimum temperature range to carry out the reaction in the absence of catalysts is between 170 and 210° C.

However, the reaction of the acid chlorides with the dihydric phenols can also be catalyzed. Thus far, the following compounds have been mentioned as catalysts: magnesium chloride, calcium chloride and aluminum chloride, as well as the halides of heavy metals and tertiary amines.

By means of a condensation experiment in o-dichlorobenzene it was proven that both magnesium chloride and calcium chloride accelerate the reaction only negligibly. Aluminum chloride, however, strongly accelerates the evolution of hydrogen chloride but the polyaryl esters obtained have only average molecular weights (<10,000), which is most likely caused by side-reactions of the Friedel-Crafts type.

Some heavy metal halides also accelerate the reaction but at a reaction temperature of 180° C. in no case was the reaction time less than 24 hours.

Also, M. Matzner and R. Barclay (J. of Appl. Pol. Sci., vol. 9, pp. 3321–3336 (1965)) have disclosed that metalic magnesium catalyzes the condensation of dicarboxylic acid chlorides with dihydric phenols into polyaryl esters. The investigations by Korshak et al. in Vyosk. soed. 3, 66 (1969), according to which magnesium proved catalytically ineffective, seem to be contrary thereto and Matzner attributes this contradiction to the selected reaction temperatures and shows that at temperatures of around 180° C. final viscosities of only approximately 0.12 are obtained, whereas he obtained final viscosities of approximately 0.6 at temperatures around 140° C. The viscosities as set forth herein are measured on a solution of 0.2 g. of polymer in 100 ml. of 60/40 phenol/tetrachloroethane by weight at a temperature of 25° C.

It is accordingly an object of the invention to provide an inexpensive, rapid process for producing polyaryl esters of relatively high molecular weight.

This has now been realized in accordance with the present invention wherein dihydric phenols are condensed with aromatic dicarboxylic acid chlorides such as terephthaloyl chloride, isophthaloyl chloride or mixtures thereof in solution in an inert, high boiling organic solvent at a temperature in excess of about 170° C. and in the presence of metallic magnesium as catalyst. Advantageously the magnesium is employed as a fixed bed having a large surface area. The conversion rapidly exceeds 80% as determined by formation of HCl and, if desired, the condensation can later be carried further in known manner to achieve viscosities far in excess of about 0.6, e.g. in excess of 1.

In a preferred embodiment the invention involves preparing polyaryl esters having viscosity indices of at least about 0.6 by trickling solutions of aromatic dicarboxylic acid chlorides and dihydric phenols in inert, high-boiling organic solvents over a magnesium granulate in the form of a fixed bed, preferably in vertical contact pipes, at temperatures between 170 and 280° C., preferably 170° C. and 220° C. The hydrogen chloride evolved is vented preferably via outlets disposed laterally at the fixed bed or at the lower end of the fixed bed and, if necessary, the reaction mixture is subsequently further condensed in accordance with known methods.

It is especially surprising that at a contact temperature of 175° C., for example, a conversion of approximately 90% is reached after a contact or residence time of 4 minutes, whereas at temperatures of less than about 170° C. and the same residence times on the magnesium, conversions of only 20 to 40% are achieved. Contrary to the results described by Matzner, the viscosity indices realized after condensation are higher than about 0.6 and the mean molecular weight is more than 10,000 as is necesary for polyaryl esters having mechanically useful strengths.

In the preferred embodiment the metallic magnesium is used in coarsely divided form, for instance in the form of the generally accessible Grignard chips, and fills a lengthy pipe which is externally heated either electrically or by means of a fluid jacket. The necessary residence time in contact with the magnesium may be as little as about 0.5 minute or as much as about 10 minutes or more, but about 3 to 5 minutes is preferred. By residence time there is intended that period of time required for the drops of the solution of the starting materials for the polycondensation to flow through the fixed magnesium bed. In the case of relatively large throughputs it is advisable to provide the flow pipe with several gas vent pipes in order for the evolved hydrogen chloride to escape without pressure. At lower throughputs the hydrogen chloride gas can leave the pipe with the liquid product.

The specific reaction temperatures depend upon the solvent selected and should not exceed its boiling point at the ambient pressure.

The fixed magnesium bed can have any desired geometrical configuration, such as spherical or square, but the preferred configuration is one or more small diameter vertical cylinders such as is used for vapor phase oxidation to produce phthalic anhydride. The contact pipes should preferably be heated indirectly, e.g. electrically or by means of vapor or hot liquids. Furthermore, the reaction mixture used is preferably preheated to ensure uniformity of reaction.

After leaving the reaction pipe, the reaction solution is conducted into a reaction vessel, where the reaction solution is degasified and, if necessary, further condensed in known manner, e.g., over magnesium chips at a temperature of 180° C. while stirring well. In this manner molecular weights of 30,000 to 40,000 or more can readily be achieved.

In addition to the high molecular weights of the polyaryl esters that can be realized, the fact that the course of the reaction can be controlled even when reacting large quantities is another decisive advantage. The catalyzed reaction of diacid chlorides and dihydric phenols may set in very vigorously so that, in the case of large, discontinuous reactions, the evolution of hydrogen chloride can sometimes become violently uncontrollable. In the novel method the quantity of reactants in contact with the catalyst at any given moment is very small so that it is easy to control the course of the reaction.

A special advantage of the process is that a conversion of at least about 80% is achieved in very short reaction periods. Magnesium is a very effective catalyst for the reaction of acid chlorides and dihydric phenols, but at high temperatures Friedel-Crafts reactions seem to be initiated as side-reactions so that only low molecular weight polyaryl esters will be formed if, at the beginning of the reaction, too high a concentration of free phenol groups is present.

As suitable aromatic dicarboxylic acid chlorides terephthaloyl chloride, isophthaloyl chloride and mixtures thereof are preferred but there can also be used one or more substituted aromatic dicarboxylic acid chlorides of the general formula

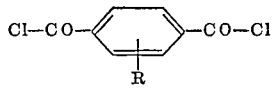

wherein

R is a lower alkyl, halogen, —NO₂ or —COO— lower alkyl radical.

The dihydric phenols may be condensed rings or not, and include such mononuclear phenols or hydroquinone, resorcin, benzcatechin, and the like.

Suitable non-condensed polynuclear dihydric phenols include those of the following general formula

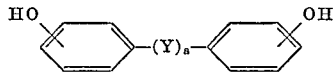

wherein $a$ is 0 or 1, and

Y is oxygen, sulfur, a carbonyl bridge, a disulfide bridge, a sulfone bridge or an optionally phenyl substituted alkylene or cycloalkylene radical.

Representative phenols include the dihydroxydiphenyls (i.e. 2,2'-, 2,4'-, 3,3'- and 4,4'-dihydroxydiphenyl), 4,4'-dihydroxy-2-methyldiphenyl, 4,4'-dihydroxy-2,2'-dimethyldiphenyl, 4,4'-dihydroxy-3,3'-dimethyldiphenyl, 6,6'-dihydroxy-3,3'-dimethyldiphenyl, and the like.

Other suitable phenols include the dihydroxybenzophenones such as 2,2'-, 2,3'-, 2,4'-, 3,3'-, 3,4'-, 4,6'-, 6,6'-dihydroxybenzophenone, and the like; dihydroxydiphenyl- sulfides such as 2,2'-, 4,4'-dihydroxydiphenylsulfone; dihydroxydiphenylethers such as bis-(4-hydroxyphenyl-)-ether; dihydroxydiphenylalkane or dihydroxydiphenylcycloalkane such as 2,2'-, 4,4'-dihydroxydibenzyl;
2,2'-, 2,3'-, 2,4'-, 2,5'-, 2,6'-, 3,3'-, 3,4'-, 3,5'-, 3,6'-, 4,4'-, 4,5'-, 4,6'-, 5,5'-, 5,6'-, 6,6'-dihydroxydiphenyl-2,2-propane;
2,2-bis-(4-hydroxy-3-chlorophenyl-)-propane;
2,2'-, 4,4'-dihydroxy-diphenylmethane;
4,4'-dihydroxy-3,3'-dimethyldiphenylmethane;
4,4'-dihydroxydiphenylmethylmethane;
4,4'-dihydroxy-diphenyldiphenylmethane;
bis-(4-hydroxyphenyl)-4'-methylphenylmethane;
1,1-bis-(4-hydroxyphenyl)-cyclohexane;
bis-(4-hydroxyphenyl)-cyclohexylmethane;
1,1-bis-(4-hydroxyphenyl)-ethane;
1,1-bis(4-hydroxyphenyl-)-2,2,2-trichloroethane;
1,1-bis-(4-hydroxyphenyl)-4'-methylphenylmethane;
phenolphthalein;

and the like.

Condensed dihydric phenols include the dihydroxynaphthalenes, dihydroxyanthracenes, etc., such as 1,3-, 1,4-, 1,5-, 1,6-, 1,7-, 1,8-, 2,6-, and 2,7-dihydroxynaphthalene.

The phenyl groups of the aforementioned dihydric phenols may also have alkoxy, carboxy and phenoxy groups as substituents in addition to alkyl groups. It is understood that mixtures of the aforementioned phenols may also be used for the reaction according to the invention. The preferred dihydric phenol is 2,2-bis-(4-hydroxyphenyl)-propane, which is also referred to as bisphenol A or dian in the literature.

Inert, high-boiling organic solvents which can be used in the present invention are those that do not react either with the starting substances or the end product and which completely or largely dissolve the polyaryl esters. Representative solvents include the chlorinated aromatic hydrocarbons such as chlorobenzene, dichloro-, trichloro- and tetrachlorobenzenes, chlorinated diphenyls or diphenyl ethers, chlorinated naphthalenes, as well as nonchlorinated aromatics such as terphenyl, benzophenones, dibenzylbenzenes, and the like.

The isolation of the polyaryl esters obtained is realized in accordance with known methods by precipitating with non-solvents such as methanol, acetone, aliphatic hydrocarbons, and the like. But it can also be effected by evaporating the solvent at high temperatures, under vacuum if possible, using vacuum double screw extruders in the form of a molten ribbon. The viscosity index ($Z_n$) should be at least about 0.6 to impart suitable mechanical properties. *

The linear, thermoplastic polyaryl esters prepared from dicarboxylic acids and dihydric phenols have excellent properties. They are transparent and extremely tenacious; moreover, they exhibit high impact strength. They are suitable for the preparation of high-quality sheets for special applications where good mechanical values are required.

The method according to the instant invention is illustrated by the following examples.

EXAMPLE 1

A glass pipe of 90 cm. length and 6 cm. diameter, which was provided with an electric ribbon-coil heater, was used as the reactor. The heating of the reaction pipe was controlled by two contact thermometers. The pipe

---

*Z means reduced specific viscosity of the general formula $$\frac{\eta - \eta_0}{\eta \cdot c}$$

whereby $\eta$ = viscosity of the solution
$\eta_0$ = viscosity of the pure solvent
$c$ = concentration of the polymer in the solvent was filled over a length of 60 cm. with commercial magnesium chips as customary in Grignard reactions. A dropping funnel, heatable by means of steam, was disposed to collect the reaction mixture flowing out, one outlet being connected with a condenser and mounted waste gas conduit for evolved hydrogen chloride.

A solution of 50.75 g. (0.25 mole) of terephthaloyl chloride, 50.75 g. (0.25 mole) of isophthaloyl chloride and 114 g. (0.5 mole) of bisphenol A in 500 ml. of o-dichlorobenzene, produced by heating the mixture to approximately 100° C., was supplied to the heated dropping funnel. The exterior wall of the reaction pipe was maintained at 175° C. The reaction solution was dropped onto the magnesium chips packing over an hour. In this process evolved hydrogen chloride was conducted into a caustic soda solution via the waste gas conduit. Following use of the entire reaction solution, the quantity of hydrogen chloride evolved was determined titrimetrically. In addition to the quantity of HCl escaping as a gas, a considerable amount is dissolved in the o-dichlorobenzene solution. This quantity can be determined by brief shaking out with ice-cold caustic soda. From a blank containing the acid chloride mixture dissolved in o-dichlorobenzene it was possible to prove that, under these test conditions, treatment with cold diluted caustic soda does not cause saponification of the acid chloride groups. Based on the amount of hydrogen chloride which would be produced if the condensation went to completion, it was possible in this manner to locate 50% of the hydrogen chloride in the waste gas and 40% in the o-dichlorobenzene. Thus, a conversion of 90% was realized. The mean residence time in the pipe was determined to be 9 minutes.

The reaction solution was condensed another hour over magnesium chips at 180° C. in the flask. The viscosity index of the polyaryl ester was 1.39 after isolating it by precipitating with methanol, suction filtering the precipitate, washing with methanol and subsequently drying at 180° C.

EXAMPLES 2 TO 15

Operation was analogous to Example 1, but different reagents and conditions were used, as set out in the table. In all experiments the dihydric phenol used was employed in approximately equimolar amounts with acid chloride and both were dissolved in 500 ml. of solvent. The reaction mixture removed from the contact pipe after each reaction was subjected to a post-condensation over magnesium chips in a stirring vessel for one hour at 180° C. The viscosity index listed in the last column of the table refers to this final product.

The feed time is that period of time necessary for flow of the entire solution through the contact pipe. The percentage figure regarding hydrogen chloride and in the solvents includes values for that found as gas based on the theoretical maximum at a conversion of 100%. The abbreviations employed in the table have the following meanings:

TDC=trephthalic acid dichloride
IDC=isophthalic acid dichloride
5-Cl-IDC=5-chloro-isophthalic acid dichloride
o-DCB=o-dichlorobenzene
TrCB=trichlorobenzene-isomer mixture
TeCB=tetrachlorobenzene-isomer mixture
DBB=dibenzylbenzene

TABLE

| Ex. No. | Acid chlorides (mole percent) | Dihydric phenols (mole percent) | Solvent | Contact temperature, °C. | Feeding time, minutes | Mean residence time, minutes | Percent of HCl in gas | Percent of HCl in solvent | Viscosity index of post-condensate |
|---|---|---|---|---|---|---|---|---|---|
| 2 | TDC (50), IDC (50) | Bisphenol-A (100) | o-DCB | 130 | 25 | 4 | 10 | 5 | 1.35 |
| 3 | TDC (50), IDC (50) | ----do---- | o-DCB | 150 | 25 | 4 | 17 | 10 | 1.37 |
| 4 | TDC (50), IDC (50) | ----do---- | o-DCB | 160 | 25 | 4 | 20 | 14 | 1.37 |
| 5 | TDC (50), IDC (50) | ----do---- | o-DCB | 175 | 25 | 4 | 50 | 40 | 1.30 |
| 6 | TDC (50), IDC (50) | ----do---- | TrCB | 205 | 25 | 4 | 50 | 43 | 1.40 |
| 7 | TDC (50), IDC (50) | ----do---- | TeCB | 230 | 25 | 4 | 60 | 36 | 1.45 |
| 8 | TDC (50), IDC (50) | ----do---- | o-DCB | 175 | 10 | 3 | 50 | 40 | 1.35 |
| 9 | TDC (50), IDC (50) | ----do---- | o-DCB | 175 | 7 | 1 | 40 | 40 | 1.37 |
| 10 | IDC (100) | Resorcinol | o-DCB | 175 | 4 | 0.5 | 30 | 30 | 1.36 |
| 11 | IDC (100) | Resorcinol (50) | o-DCB | 170 | 25 | 4 | 50 | 42 | 2.45 |
| 12 | IDC (100) | Resorcinol(50), 3,3'-dichloro-bisphenol A (50) | o-DCB | 175 | 25 | 4 | 45 | 40 | 1.52 |
| 13 | TDC (50), IDC (50) | Phenolphthalein (50), bis-(4-hydroxyphenyl)-diphenylmethane (50). | TrCB [a] | 200 | 35 | 3 | 50 | 42 | 1.06 |
| 14 | IDC (70), TDC (30) | Bisphenol A (70), 4,4'-dihydroxydiphenylsulfone (30) | TrCB | 200 | 25 | 4 | 50 | 35 | 1.10 |
| 15 | TDC (50), IDC (25), 5-Cl-IDC (25). | Resorcinol (60), 4,4'-dihydroxydiphenylether (40) | DBB | 210 | 15 | 3 | 55 | 40 | 1.26 |

[a] 1,000 milliliters.

EXAMPLE 16

In a comparison test the catalytic effectiveness of the packing of magnesium chips is demonstrated.

A solution as described in Example 1 was trickled over an equal volume of porous ceramic bodies as used in distillation columns under the test conditions described in Example 1. In the waste gas there was found 9% of the theoretical amount of hydrogen chloride and 8% was found in the o-dichlorobenzene, i.e. a total conversion of 17% as against 90% when working over magnesium chips as described in Example 1.

It will be appreciated that the instant specification and examples are set forth by way of illustration and not limitation, and that various modifications and changes may be made without departing from the spirit and scope of the present invention.

What is claimed is:

1. In the preparation of a polyaryl ester by condensing at least one aromatic dicarboxylic acid chloride with at least one dihydric phenol in the presence of metallic magnesium as catalyst to produce HCl and a polyaryl ester, the improvement which comprises dissolving said acid chloride and phenol in an inert organic solvent and trickling said solution over the metallic magnesium in granular form at a temperature between about 170 and 280° C. and with an average residence time of less than about 10 minutes.

2. Process according to claim 1, wherein the residence time ranges from about 0.5 to 10 minutes whereby at least about 80% of the theoretical amount of HCl is evolved, and including the further step of heating the product until the viscosity of the ester exceeds about 0.6.

3. Process according to claim 1, wherein the magnesium is present as a fixed bed in a tube heated to about 170 to 220° C. and provided with outlets for the HCl gas evolved.

4. Process according to claim 1, wherein said acid chloride comprises terephthaloyl chloride, isophthaloyl chloride or mixtures thereof.

5. Process according to claim 1, wherein said dihydric phenol comprises 2,2 - bis - (4-hydroxyphenyl)-propane, phenolphthalein, resorcinol, bis - (4-hydroxyphenyl)-sulfone, bis-(4-hydroxyphenyl)-ether, 2,2 - bis-(3-chloro-4- hydroxyphenyl)-propane, bis - (4 - hydroxyphenyl)-diphenyl-methane, or mixtures thereof.

6. Process according to claim 1, wherein said solvent comprises a chlorinated aromatic hydrocarbon.

7. Process according to claim 2, wherein the magnesium is present as a fixed bed in a tube heated to about 170 to 220° C. and provided with outlets for the HCl gas evolved, said dihydric phenol comprises 2,2-bis-(4-hydroxyphenyl)-propane, phenolphthalein, resorcinol, bis-(4-hydroxyphenyl)-sulfone, bis-(4-hydroxyphenyl)-ether, 2,2 - bis-(3-chloro-4-hydroxyphenyl)-propane, bis-(4-hydroxyphenyl)-diphenyl-methane, or mixtures thereof, and said solvent comprises a chlorinated aromatic hydrocarbon.

References Cited
UNITED STATES PATENTS 3,536,665  10/1970  Pietrusza et al. _____ 260—49

MELVIN GOLDSTEIN, Primary Examiner

U.S. Cl. X.R.

260—47 C, 49